(12) United States Patent
Heaton (10) Patent No.: US 7,513,224 B2
(45) Date of Patent: Apr. 7, 2009

(54) SPLIT-CYCLE AIRCRAFT ENGINE

(75) Inventor: Clifford D. Heaton, Ware, MA (US)

(73) Assignee: The Scuderi Group, LLC, West Springfield, MA (US)

( * ) Notice: Subject to any disclaimer, the term of this patent is extended or adjusted under 35 U.S.C. 154(b) by 173 days.

(21) Appl. No.: 11/518,828

(22) Filed: Sep. 11, 2006

(65) Prior Publication Data

US 2009/0050103 A1 Feb. 26, 2009

(51) Int. Cl.
*F01B 7/12* (2006.01)
(52) U.S. Cl. .................... 123/51 R; 60/39.62
(58) Field of Classification Search ............ 123/52.1–3, 123/53.1, 53.3, 53.5, 55.4, 55.5, 55.2, 431, 123/68, 70 R, 51 R, 51 AC, 51 BC, 51 BD; 60/597, 653, 668, 698, 706, 712, 727, 729, 60/39.62
See application file for complete search history.

(56) References Cited

U.S. PATENT DOCUMENTS

| | | | | |
|---|---|---|---|---|
| 4,185,596 A | * | 1/1980 | Noguchi et al. ............ 123/51 B |
| 4,696,158 A | * | 9/1987 | DeFrancisco .............. 60/39.62 |
| 6,058,901 A | * | 5/2000 | Lee .......................... 123/197.1 |
| 6,340,004 B1 | * | 1/2002 | Patton ...................... 123/25 C |
| 6,789,514 B2 | * | 9/2004 | Suh et al. .................. 123/70 R |
| 7,353,786 B2 | * | 4/2008 | Scuderi et al. ............... 123/68 |
| 2004/0255882 A1 | * | 12/2004 | Branyon et al. ........... 123/70 R |
| 2008/0006739 A1 | * | 1/2008 | Mochida et al. ............... 244/60 |

* cited by examiner

*Primary Examiner*—Michael Cuff
*Assistant Examiner*—Hung Q Nguyen
(74) *Attorney, Agent, or Firm*—Fildes & Outland, P.C.

(57) ABSTRACT

A split-cycle aircraft engine includes a crankshaft rotatable about a crankshaft axis. A power piston is slidably received within a power cylinder and is operatively connected to the crankshaft such that the power piston reciprocates through an expansion stroke and an exhaust stroke during a single rotation of the crankshaft. A compression piston is slidably received within a compression cylinder and is operatively connected to the crankshaft such that the compression piston reciprocates through an intake stroke and a compression stroke during a single rotation of the crankshaft. A gas crossover passage operatively interconnects the compression cylinder and the power cylinder. An air reservoir is operatively connected to the gas crossover passage by a reservoir passage. The air reservoir is selectively operable to receive and deliver compressed air. The engine is mounted to an aircraft and the air reservoir is disposed within the aircraft.

13 Claims, 8 Drawing Sheets

SPLIT-CYCLE AIRCRAFT ENGINE

TECHNICAL FIELD

This invention relates to split-cycle engines, and more particularly to split-cycle aircraft engines.

BACKGROUND OF THE INVENTION

The term split-cycle engine as used in the present application may not have yet received a fixed meaning commonly known to those skilled in the engine art. Accordingly, for purposes of clarity, the following definition is offered for the term split-cycle engine as may be applied to engines disclosed in the prior art and as referred to in the present application.

A split-cycle engine as referred to herein comprises:

a crankshaft rotatable about a crankshaft axis;

a power piston slidably received within a power cylinder and operatively connected to the crankshaft such that the power piston reciprocates through a power (or expansion) stroke and an exhaust stroke during a single rotation of the crankshaft;

a compression piston slidably received within a compression cylinder and operatively connected to the crankshaft such that the compression piston reciprocates through an intake stroke and a compression stroke during a single rotation of the crankshaft; and a gas passage interconnecting the power and compression cylinders, the gas passage including an inlet valve and an outlet (or crossover) valve defining a pressure chamber therebetween.

U.S. Pat. Nos. 6,543,225, 6,609,371, and 6,952,923, all assigned to the assignee of the present invention, disclose examples of split-cycle internal combustion engines as herein defined. These patents contain an extensive list of United States and foreign patents and publications cited as background in the allowance of these patents. The term "split-cycle" has been used for these engines because they literally split the four strokes of a conventional pressure/volume Otto cycle (i.e., intake, compression, power and exhaust) over two dedicated cylinders: one cylinder dedicated to the high pressure compression stroke, and the other cylinder dedicated to the high pressure power stroke.

It is known in the art relating to aircraft engines to use radial engines for aeronautical applications. For example, radial engines were commonly used in World War II aircraft and in early model commercial airplanes. Radial engines are still presently used in some propeller-driven aircraft.

Radial engines differ from other common internal combustion engines such as inline and V-type engines in the arrangement of the engine cylinders. In a radial engine, the cylinders and corresponding pistons are arranged radially around the engine crankshaft in a circular pattern.

Radial engines are advantageous for airplane applications because they can produce a large amount of power, they have a relatively low maximum engine speed (rpm), avoiding the need for reduction gearing to drive propellers, and they are suitable for air cooling, eliminating the need for a water cooling system.

Although radial engines have been reliable aircraft engines and less expensive than other types of aircraft engines, use of radial engines in airplanes has substantially decreased. Conventional radial engines tend to be noisy and to consume more oil than other engine designs. Also, conventional radial engines have mechanical issues such as oil draining into the lower cylinders during non-use of the engine. This oil must be removed from the cylinders by turning the engine over by hand prior to starting the engine, which is an inconvenience to the pilot or the ground crew.

It is also known in the art of aircraft engines to use horizontally opposed engines, also known as "boxer" engines, to drive the aircraft's propellers. Boxer-type engines differ from other internal combustion engines in that the engine cylinders are arranged in a horizontally opposed relationship.

Horizontally opposed engines have the advantages of being more compact and having a lower center of gravity than other engine configurations. Horizontally opposed engines, like radial engines, potentially may be air-cooled, eliminating the need for a separate engine cooling system and thereby decreasing the overall weight of the engine. Therefore, horizontally opposed engines are suitable for aircraft applications. Horizontally opposed engines are also well balanced because each piston's momentum is counterbalanced by the corresponding movement of the piston opposing it. This reduces or may even eliminate the need for a balance shaft or counterweights on the crankshaft, further reducing the overall weight of the engine.

Horizontally opposed engines, however, are often noisier than other engine configurations such as V-type engines and inline engines. Also, horizontally opposed engines can be more difficult to fit into an engine compartment because horizontally opposed engines tend to be wider than other engine configurations.

It is further known in aeronautics that there are many uses in an aircraft for compressed air. However, conventional aircraft lack a convenient and efficient source of compressed air, thereby rendering these potential uses of compressed air infeasible.

SUMMARY OF THE INVENTION

The present invention provides various split-cycle engine arrangements for propeller-driven aircraft that are capable of storing compressed air and delivering the compressed air back to the engine or to other components of the aircraft.

In one embodiment of the present invention, a split-cycle air hybrid aircraft engine includes a crankshaft rotatable about a crankshaft axis. A power piston is slidably received within a power cylinder and operatively connected to the crankshaft such that the power piston reciprocates through an expansion stroke and an exhaust stroke during a single rotation of the crankshaft. A compression piston is slidably received within a compression cylinder and operatively connected to the crankshaft such that the compression piston reciprocates through an intake stroke and a compression stroke during a single rotation of the crankshaft. A gas crossover passage operatively interconnects the compression cylinder and the power cylinder. The gas crossover passage includes an inlet valve and an outlet valve defining a pressure chamber therebetween. An air reservoir is operatively connected to the pressure chamber by a reservoir passage at a location between the inlet valve and the outlet valve of the pressure chamber. The air reservoir is selectively operable to receive compressed air from the compression cylinders and to deliver compressed air to the power cylinders for use in transmitting power to the crankshaft during engine operation. The air reservoir may also deliver compressed air to other components of the aircraft. Valves selectively control gas flow into and out of the compression and power cylinders and the air reservoir. The engine is mounted to the aircraft and the air reservoir is disposed within the aircraft. Optionally, the air reservoir may be located in a wing of the aircraft, in an aft fuselage of the aircraft, or both. Alternative locations for the air reservoir are also within the scope of the invention.

In another embodiment of the present invention, a split-cycle horizontally opposed (i.e., "boxer") engine that may be used for aircraft applications is provided. A split-cycle horizontally opposed engine allows for the power cylinders to fire once per revolution of the crankshaft rather then every other revolution and allows the compression cylinders to compress charge air during every revolution of the crankshaft. The split-cycle horizontally opposed engine also allows for the compression cylinders to operate with a larger diameter in comparison to the power cylinders to increase the volume of air inhaled into the engine, allowing for supercharging of the engine without the use of an external supercharger.

More particularly, a split-cycle horizontally opposed ("boxer") engine in accordance with the invention includes a crankshaft rotatable about a crankshaft axis. The split-cycle boxer engine further includes a pair of horizontally opposed power cylinders on either side of the crankshaft. A power piston is slidably received within each power cylinder and is operatively connected to the crankshaft such that each power piston reciprocates through an expansion stroke and an exhaust stroke during a single rotation of the crankshaft. The split-cycle boxer engine also includes a pair of horizontally opposed compression cylinders on either side of the crankshaft. A compression piston is slidably received within each compression cylinder and is operatively connected to the crankshaft such that each compression piston reciprocates through an intake stroke and a compression stroke during a single rotation of the crankshaft. A gas crossover passage interconnects each compression cylinder with an associated, axially adjacent power cylinder. The gas crossover passage includes an inlet valve and an outlet valve defining a pressure chamber therebetween. Valves control gas flow into the compression cylinders and out of the power cylinders. An air reservoir may be operatively connected to the pressure chambers by a reservoir passage at locations between the inlet valve and the outlet valve of each pressure chamber. The air reservoir is selectively operable to receive and deliver compressed air.

In yet another embodiment of the present invention, a split-cycle radial engine that may be used for aircraft applications is provided. A split-cycle radial engine allows for sequential firing of the cylinders, which increases the torque of the engine. A split-cycle radial engine also allows for offsetting of the engine cylinders relative to the crankshaft, further increasing the torque of the engine and reducing piston-skirt friction. Moreover, a split-cycle radial engine is capable of inhaling larger volumes of charge intake air, which improves the performance of the engine at high altitudes where the air is thinner.

More particularly, a split-cycle radial engine in accordance with the invention includes a crankshaft rotatable about a crankshaft axis. The split-cycle radial engine further includes a power bank including a plurality of power cylinders radially disposed around the crankshaft. A power piston is slidably received within each power cylinder and operatively connected to the crankshaft such that each power piston reciprocates through an expansion stroke and an exhaust stroke during a single rotation of the crankshaft. A compression bank is axially adjacent the power bank. The compression bank includes a plurality of compression cylinders radially disposed around the crankshaft and equal in quantity to the number of power cylinders. A compression piston is slidably received within each compression cylinder and operatively connected to the crankshaft such that each compression piston reciprocates through an intake stroke and a compression stroke during a single rotation of the crankshaft. Each compression cylinder is paired with an associated power cylinder. Each compression and power cylinder pair includes a gas crossover passage interconnecting the compression cylinder and the power cylinder of the pair. The gas crossover passage includes an inlet valve and an outlet valve defining a pressure chamber therebetween. Valves are also provided to control gas flow into the compression cylinders and out of the power cylinders. An air reservoir may be operatively connected to the pressure chambers by a reservoir passage at locations between the inlet valve and the outlet valve of each pressure chamber. The air reservoir is selectively operable to receive and deliver compressed air.

These and other features and advantages of the invention will be more fully understood from the following detailed description of the invention taken together with the accompanying drawings.

DETAILED DESCRIPTION OF THE INVENTION

Figure 1:
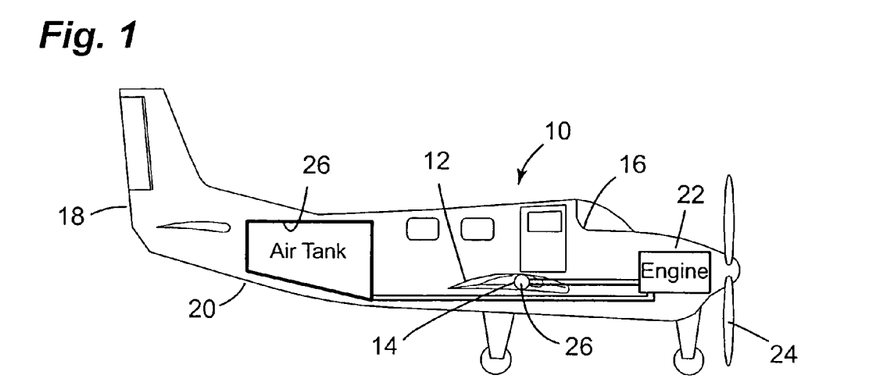
FIG. 1 is a side schematic view of an aircraft including a split-cycle air hybrid engine and compressed air tanks in accordance with the invention.
Figures 2, 3:
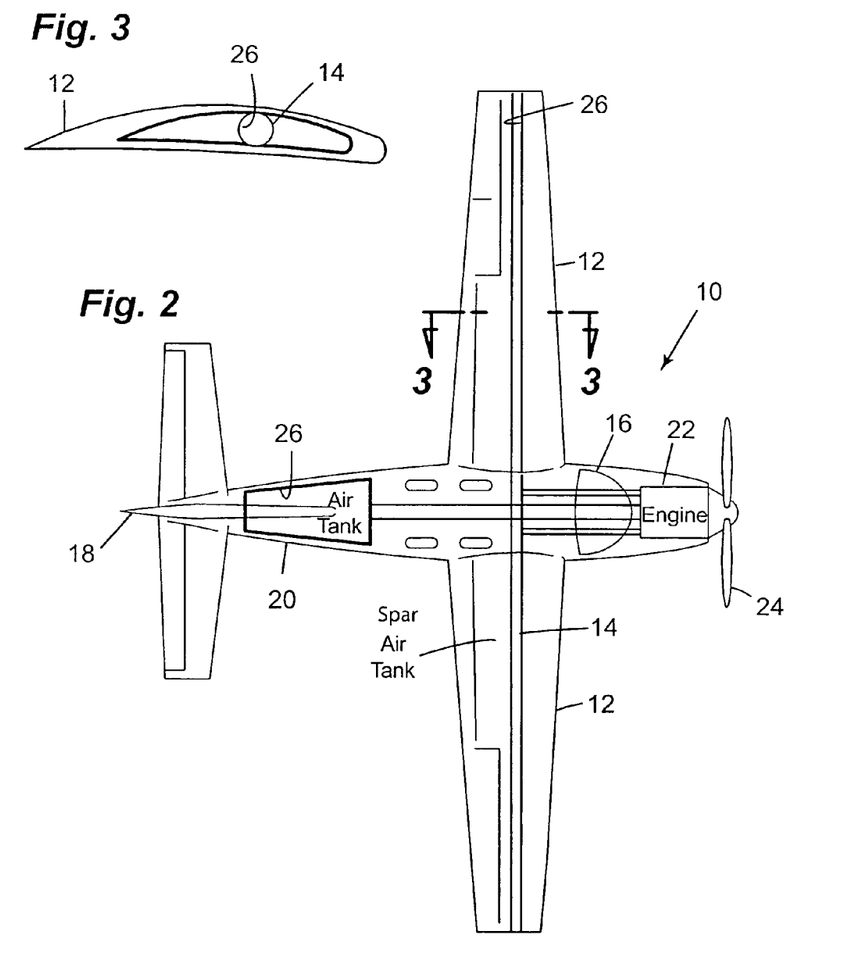
FIG. 2 is a plan schematic view of the aircraft of FIG. 1.
FIG. 3 is a cross-sectional view of the aircraft taken along the line 3-3 in FIG. 2.

Referring now to the drawings in detail, numeral 10 generally indicates a propeller-driven aircraft. As illustrated in FIGS. 1 through 3, the aircraft 10 has a pair of wings 12, a wing spar 14 in the wings 12, a cockpit 16, a tail 18, and an aft fuselage 20. The aircraft 10 may have one wing spar 14 spanning both wings 12, or a separate wing spar may be located in each wing 12. A split-cycle engine 22 in accordance with the invention is mounted in the aircraft 10 forward of the cockpit 16 to drive the propeller 24. Air storage tanks 26 may be located in the wing spar 14, the aft fuselage 20, or both. The air storage tank(s) may also be located in any other suitable location within the aircraft 10, for example, in a suitable location within the wings 12 other than the wing spar 14.

Turning first to FIGS. 4 through 9, in one embodiment of the invention, the split-cycle engine 22 may be a horizontally opposed ("boxer") type split-cycle engine. The split-cycle boxer engine 22 includes a crankshaft 28 rotatable about a crankshaft axis 30. The split-cycle boxer engine 22 further includes a pair of horizontally opposed power cylinders 34 on either side of the crankshaft 28. A power piston 36 is slidably received within each power cylinder 34 and is operatively connected to the crankshaft 28 such that each power piston 36 reciprocates through an expansion stroke and an exhaust stroke during a single rotation of the crankshaft 28. The split-cycle boxer engine 22 also includes a pair of horizontally opposed compression cylinders 40 on either side of the crankshaft 28. A compression piston 42 is slidably received within each compression cylinder 40 and is operatively connected to the crankshaft 28 such that each compression piston 42 reciprocates through an intake stroke and a compression stroke during a single rotation of the crankshaft 28. A gas crossover passage 44 interconnects each compression cylinder 40 with an associated, axially adjacent power cylinder 34. The gas crossover passage 44 includes an inlet valve 46 and an outlet valve 48 defining a pressure chamber 50 therebetween. The air pressure in the pressure chamber 50 is maintained at an elevated minimum pressure through the engine cycles. Valves 52 control gas flow into the compression cylinders 40 and out of the power cylinders 34. The valves 44, 46, 52 may be check valves, poppet valves, or any other suitable valve. The valves 44, 46, 52 may be cam actuated, electronically actuated, pneumatically actuated, or hydraulically actuated. The air reservoir 26 may be operatively connected to the pressure chambers 50 by a reservoir passage 54 at locations between the inlet valve 46 and the outlet valve 48 of each pressure chamber 50. The air reservoir 26 is selectively operable to receive and deliver compressed air.

The split-cycle boxer engine 22 shown in FIGS. 4 through 9 includes one pair of power cylinders 34 and one pair of compression cylinders 40 for a total of four cylinders. If additional horsepower is desired, another pair of power cylinders and compression cylinders may be added for a total of eight cylinders. It should be understood, however, that the engine 22 may have any number of cylinders, so long as there are an even number of power cylinders, an even number of compression cylinders, and an equal number of power and compression cylinders (since each power cylinder must be paired with a compression cylinder).

The power cylinders 34 may be disposed in front of the compression cylinders 40 to allow for improved air-cooling of the hotter power cylinders 34 during engine operation. A longitudinal axis 56 of each compression cylinder 40 and each power cylinder 34 may be offset from the rotational axis 30 of the crankshaft 28. The offset of the cylinder axes 56 from the crankshaft axis 30 allows for greater mechanical advantage and increased torque. On each side of the engine 22 one of a pair of horizontally opposed cylinders is raised above the rotational axis 30 of the crankshaft 28 and the other is lowered below the rotational axis 30 of the crankshaft 28. Further, because the compression cylinders 40 are separate from the power cylinders 34, the compression cylinders 40 may be designed to have a larger diameter than the power cylinders 34. This results in the compression cylinders 40 having a larger volume than the power cylinders 34, allowing the engine to be supercharged without the use of an external supercharger. This also can improve engine efficiency at higher altitudes by allowing the engine to intake larger volumes of thin air compared to conventional engines. The power pistons 36 may also be designed with a longer throw on the crankshaft 28 compared to the compression pistons 42 for a longer stroke to over-expand the gas in the power cylinders 34 and to provide increased efficiency, i.e., the Miller Effect.

The compression pistons 42 lag slightly behind the power pistons 36 (in degrees of crank angle rotation). This is in contrast to conventional horizontally opposed engines in which neighboring pairs of pistons travel 180 crank angle degrees apart. During operation of the engine 22, as the compression pistons 42 reach top dead center (TDC), the power pistons 36 have already reached TDC and have begun the power stroke. Fuel is ignited in each power cylinder 34 within a range of 5 to 40 degrees crank angle after the power piston 36 associated with the power cylinder 34 has reached its top dead center position (degrees ATDC). Preferably, fuel is ignited in each power cylinder 34 within a range of 10 to 30 degrees ATDC.

Figure 4:
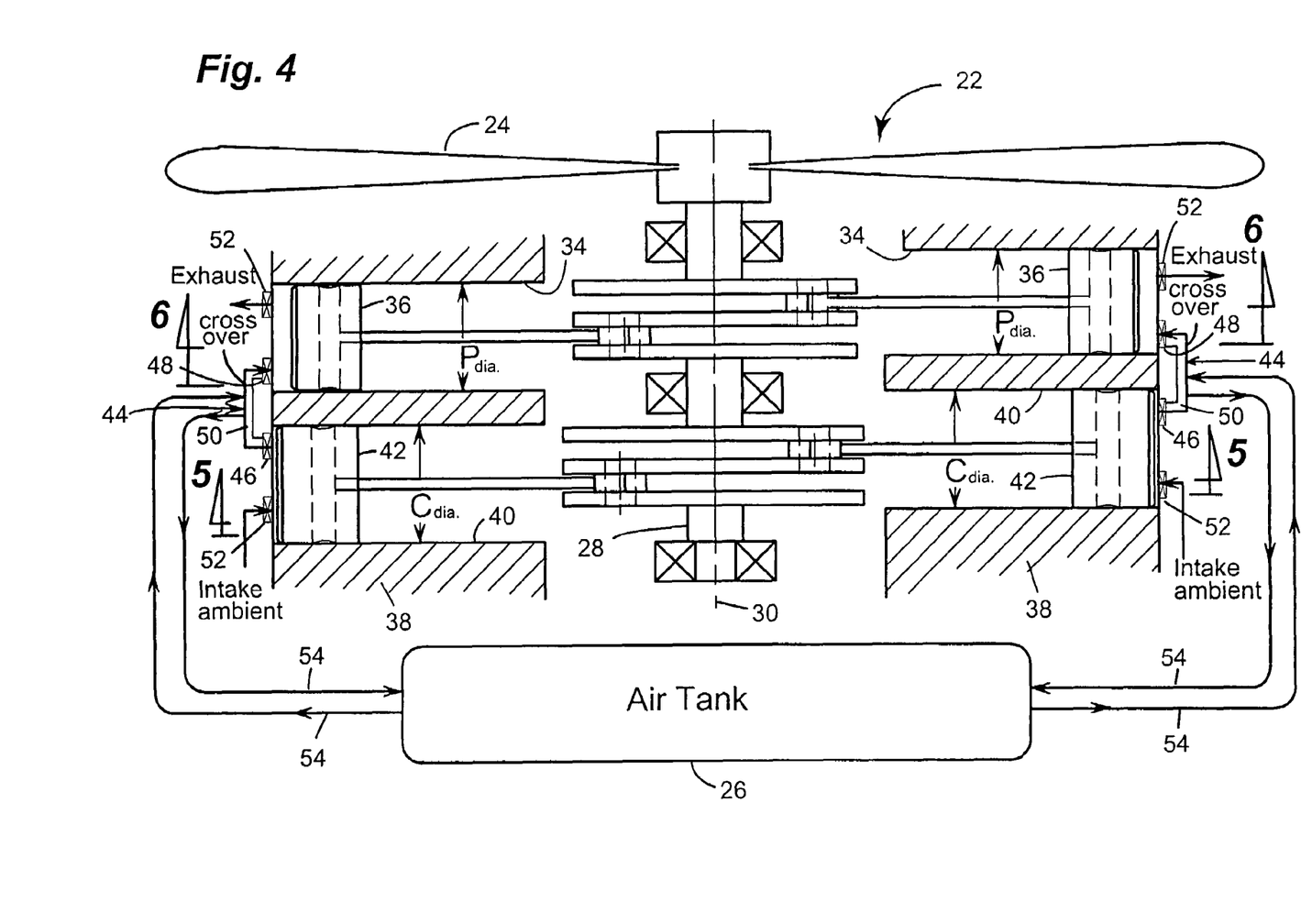
FIG. 4 is a schematic view of a split-cycle horizontally opposed ("boxer") engine in accordance with the invention having an air storage tank illustrating pistons of the engine around top dead center.
Figure 5:
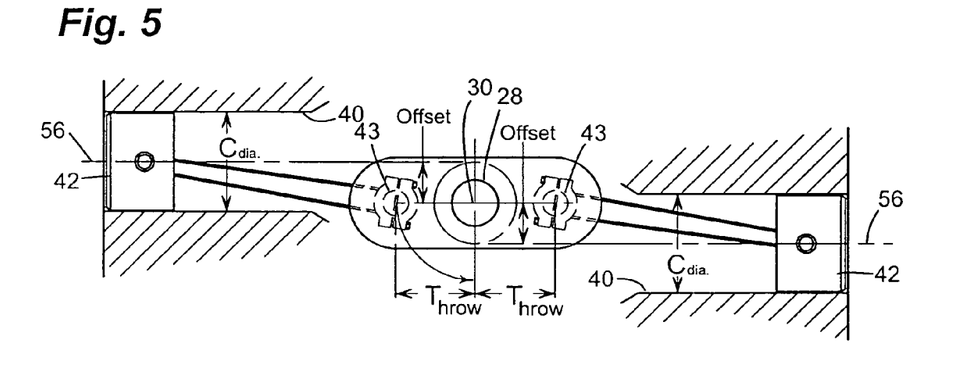
FIG. 5 is a cross-sectional view of the split-cycle horizontally opposed engine taken along the line 5-5 in FIG. 4.
Figure 6:
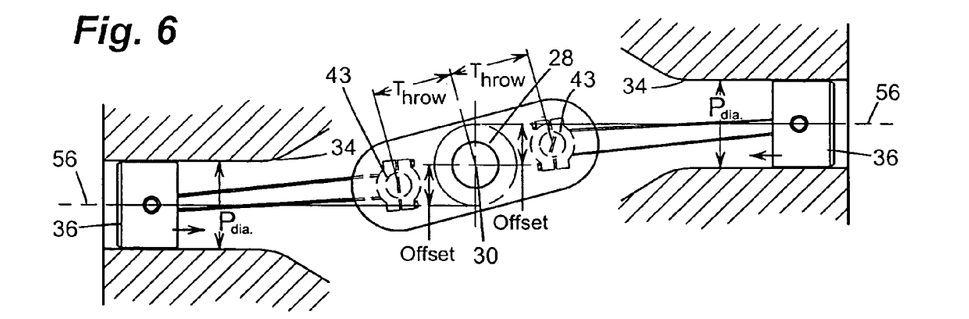
FIG. 6 is a cross-sectional view of the split-cycle horizontally opposed engine taken along the line 6-6 in FIG. 4.
Figure 7:
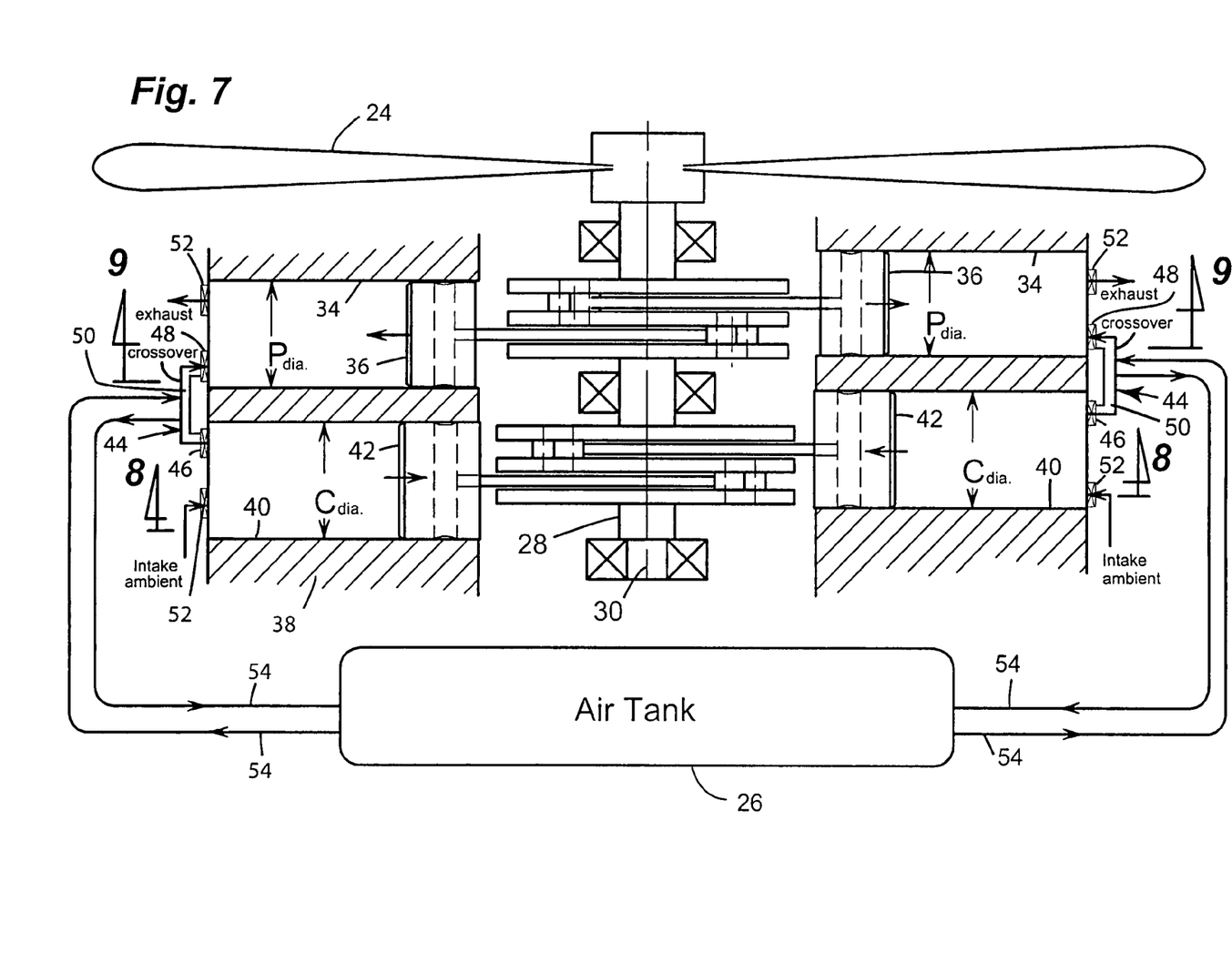
FIG. 7 is another schematic view of the split-cycle horizontally opposed engine of FIG. 4 illustrating the pistons around bottom dead center.
Figure 8:
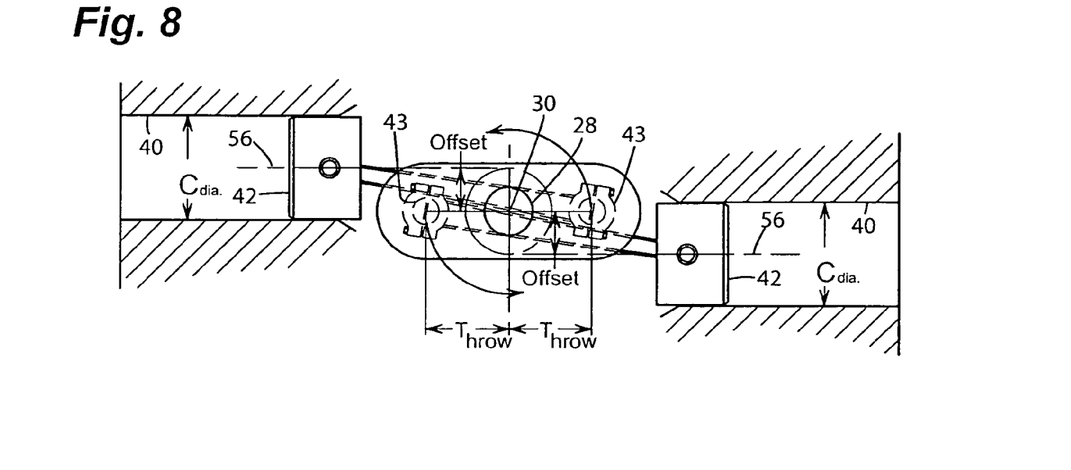
FIG. 8 is a cross-sectional view of the split-cycle horizontally opposed engine taken along the line 8-8 in FIG. 7.
Figure 9:
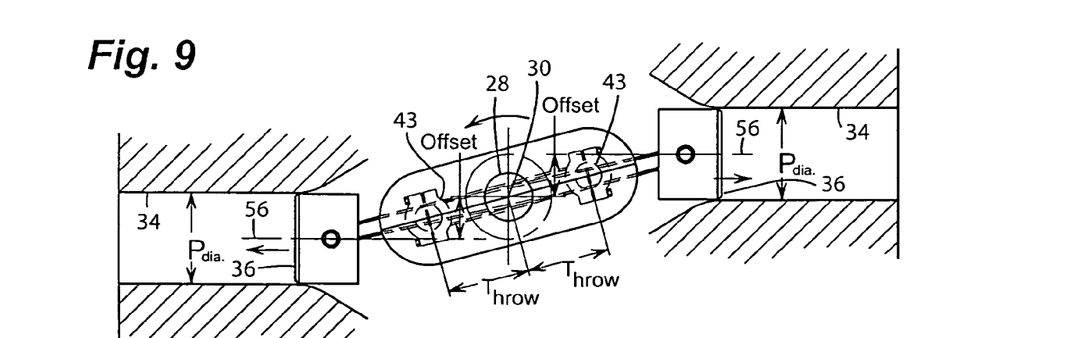
FIG. 9 is a cross-sectional view of the split-cycle horizontally opposed engine taken along the line 9-9 in FIG. 7.

FIGS. 4 through 6 illustrate the compression pistons 42 at approximately the TDC position and the power pistons 36 moving away from TDC towards bottom dead center (BDC). The rotational direction of the crankshaft 28 (FIG. 5) and the relative motions of the power pistons 36 (FIG. 6) are indicated by the arrows associated in the drawings with their corresponding components. FIGS. 7 through 9 illustrate the compression pistons 42 at approximately the BDC position and the power pistons 36 moving away from BDC towards TDC. The rotational direction of the crankshaft 28 (FIGS. 8 and 9) and the relative motions of the power pistons 36 and compression pistons 42 (FIGS. 7 and 9) are indicated by the arrows associated in the drawings with their corresponding components.

The power pistons 36 may be operatively connected to the crankshaft 28 by separate crank pins/journals 43 that are 180 degrees apart relative to the crankshaft axis 30. The paired power pistons 36 therefore reach top dead center simultaneously. Likewise, the compression pistons 42 may be operatively connected to the crankshaft 28 by separate crank pins/journals 42 that are also 180 degrees apart relative to the crankshaft axis 30. The paired compression pistons 42 therefore also reach top dead center simultaneously.

A spark plug (not shown) may extend into the each of the power cylinders 34 for igniting air-fuel charges at precise times by an ignition control, also not shown. It should be understood that the engine 22 may be made as a diesel engine and be operated without a spark plug if desired. Moreover, the engine 22 may be designed to operate on any fuel suitable for reciprocating piston engines in general, such as hydrogen, natural gas or bio-diesel.

With the use of the air reservoirs 26, the split-cycle engine 22 can function as an air hybrid. The compression cylinders 40 may then be selectively controllable to place the compression pistons 42 in a compression mode or an idle mode. The power cylinders 34 similarly may be selectively controllable to place the power pistons 36 in a power mode or an idle mode. Further, the engine 22 may be operable in at least three modes, including an internal combustion engine (ICE) mode, an air compressor (AC) mode and a pre-compressed air power (PAP) mode. In the ICE mode, the compression pistons 42 and power pistons 36 are in their respective compression and power modes, in that the compression pistons 42 draw in and compress inlet air for use in the power cylinders 34, and compressed air is admitted to the power cylinders 34 with fuel, at the beginning of an expansion stroke, which is ignited, burned and expanded on the same expansion stroke of the power pistons 36, transmitting power to the crankshaft 28, and the combustion products are discharged on the exhaust stroke. In the AC mode, the compression pistons 42 are in the compression mode and they draw in and compress air that is stored in the air reservoir 26 for later use in the power cylinder or other aircraft components as described in more detail below. In the PAP mode, the power cylinders 34 are in the power mode and receive compressed air from the air reservoir 26 which is expanded on the expansion stroke of the power pistons 36, transmitting power to the crankshaft 28, and the expanded air is discharged on the exhaust stroke.

Optionally, in the PAP mode, fuel may be mixed with the compressed air at the beginning of an expansion stroke and the mixture may be ignited, burned and expanded on the same expansion stroke of the power pistons 36, transmitting power to the crankshaft 28, and the combustion products may be discharged on the exhaust stroke. Alternatively, in the PAP mode, the compressed air admitted to the power cylinders 34 may be expanded without adding fuel or initiating combustion.

Excess compressed air, i.e., air that is not used for combustion in the power cylinders 34, is transferred from the pressure chambers 50 to the air storage tank(s) 26 via the reservoir passage 54. The stored compressed air may be used for a variety of applications. Such applications may include but are not limited to: a) starting the engine in lieu of an electric starter; b) cabin pressurization; c) inflation of inflatable door seals in pressurized aircraft; d) wheel braking, by either actuating the brake shoes and/or through the active resistance of pressurized air against spinning wheels; e) rotating the propellers for taxiing short distances without fuel being injected into the engine (see PAP mode above); f) driving the wheels of the aircraft to taxi the aircraft without starting the engine and without having the propeller turning (allowing for safer taxiing); g) spinning up the aircraft's wheels before landing so the tires are not subjected to as much frictional wear when they touch the ground during a landing; h) providing a breaking force on the aircraft's wheels for quick stopping in addition to the aircraft's conventional brakes; i) operating the engine with compressed air when the compression cylinders are in an idle mode (see PAP mode above); j) operating flight instruments that utilize gyros; k) providing fuel pressure in the event of a fuel pump failure; l) actuating flight controls and landing gear, for example an air pressure regulating valve could be used to provide finely tuned trim pressure on the control surfaces and could also operate leading edge slats; m) expelling ice from the aircraft's wings; n) inflating airbags for crash protection; o) opening a whole aircraft recovery parachute of a whole aircraft parachute recovery system in lieu of a rocket motor; p) operating emergency evacuation chutes; q) deploying pesticides, fire retardants, flares, munitions, and other items from special use aircraft; r) ejecting water from the aircraft floats and hulls of amphibious aircraft; and s) venting air from small holes in the top of the wings to mimic the effects of vortex generators at slow speeds.

Optionally, the engine 22 may also be operable in at least a fourth mode, herein designated a high power (HP) mode. In the HP mode, the compression cylinders 40 are selectively controllable to operate, in effect, as additional power cylinders having expansion strokes and exhaust strokes instead of intake strokes and compression strokes.

During the HP mode, no ambient air is inhaled into the compression cylinders 40 through intake valves 52. Rather, both the compression cylinders 40 and power cylinders 34 receive compressed air from the air reservoir 26, which is expanded on the compression and power cylinder's respective expansion strokes and discharged on their respective exhaust strokes.

In a preferred embodiment of the HP mode, the power piston 36 transmits power to the crankshaft 28 through the process of combustion, while the compression piston 42 transmits power to the crankshaft 28 through the process of expanding air from the air reservoir 26 without combustion. That is, in the power cylinder 34, fuel is mixed with the compressed air at the beginning of an expansion stroke and the mixture is ignited, burned and expanded on the same expansion stroke of the power cylinder 34. Meanwhile, in the compression cylinder 40, compressed air admitted to the compression cylinder 40 is expanded on the expansion stroke of the compression cylinder 40 without adding fuel or initiating combustion.

Operating the engine 22 in HP mode literally doubles the number of power strokes available to the aircraft for as long as the air reservoir 26 remains charged with enough air pressure to maintain the HP mode. This mode is useful for increasing power to the aircraft during critical short-term operations, such as gaining altitude to fly over a mountain or quickly accelerating to high speeds for short take-offs. Moreover, the air reservoir can be over pressurized by an external compressor on the ground to enable the engine 22 to operate in HP mode for longer periods of time during take-offs.

Figure 10:
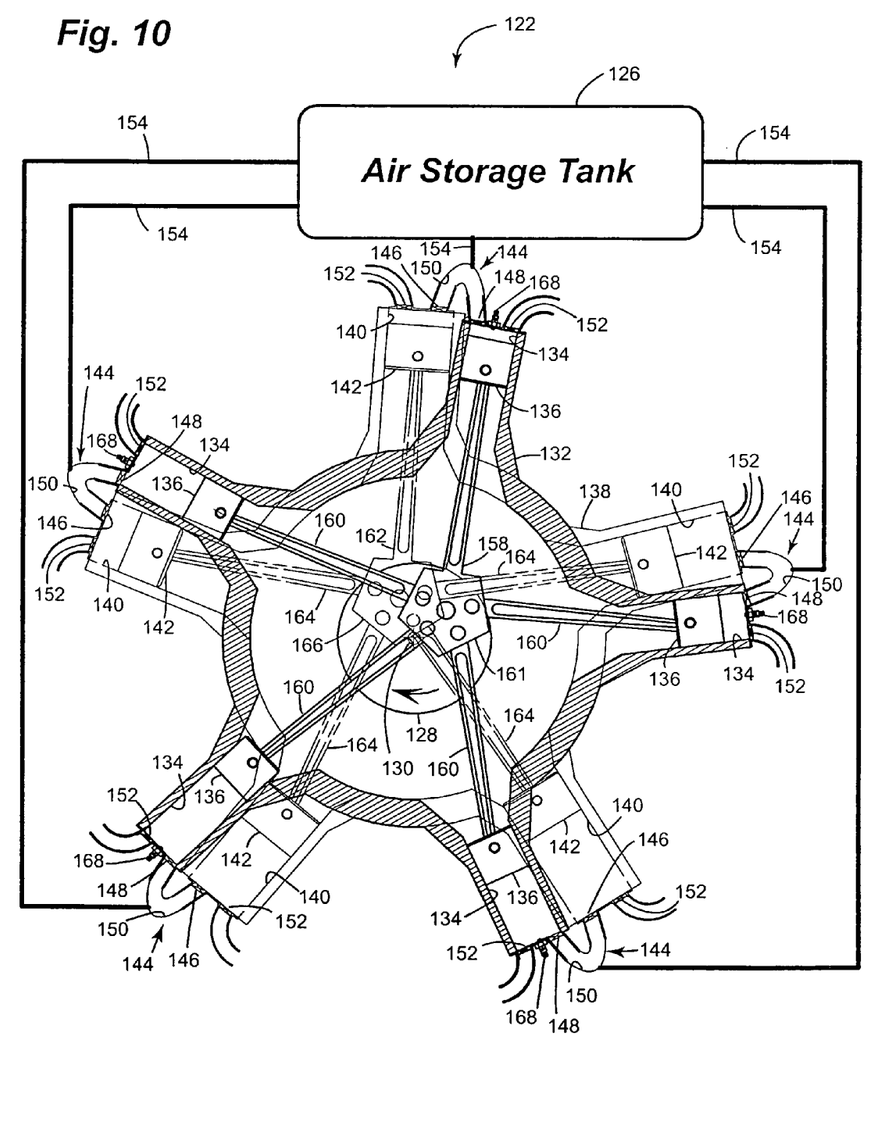
FIG. 10 is a schematic view of a split-cycle radial engine in accordance with the invention having an air storage tank.
Figure 11:
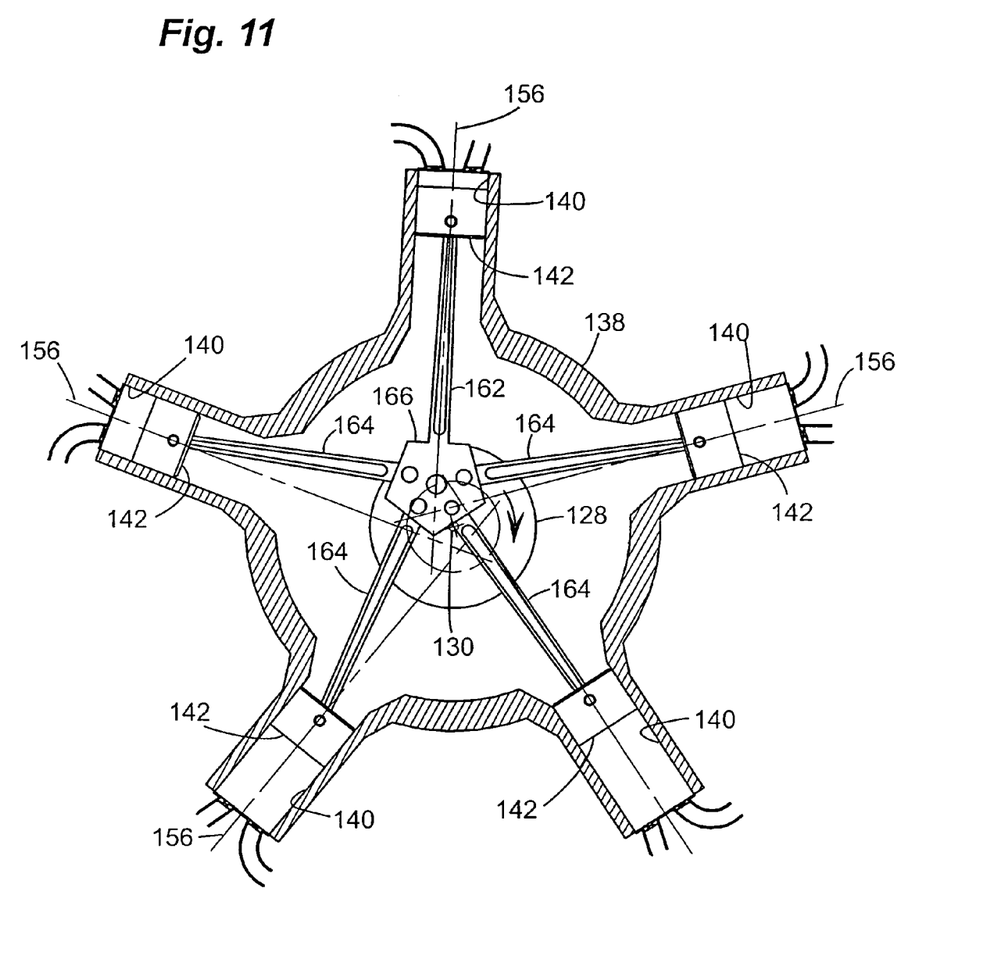
FIG. 11 is a schematic view of a compression bank of the split-cycle radial engine of FIG. 10.
Figure 12:
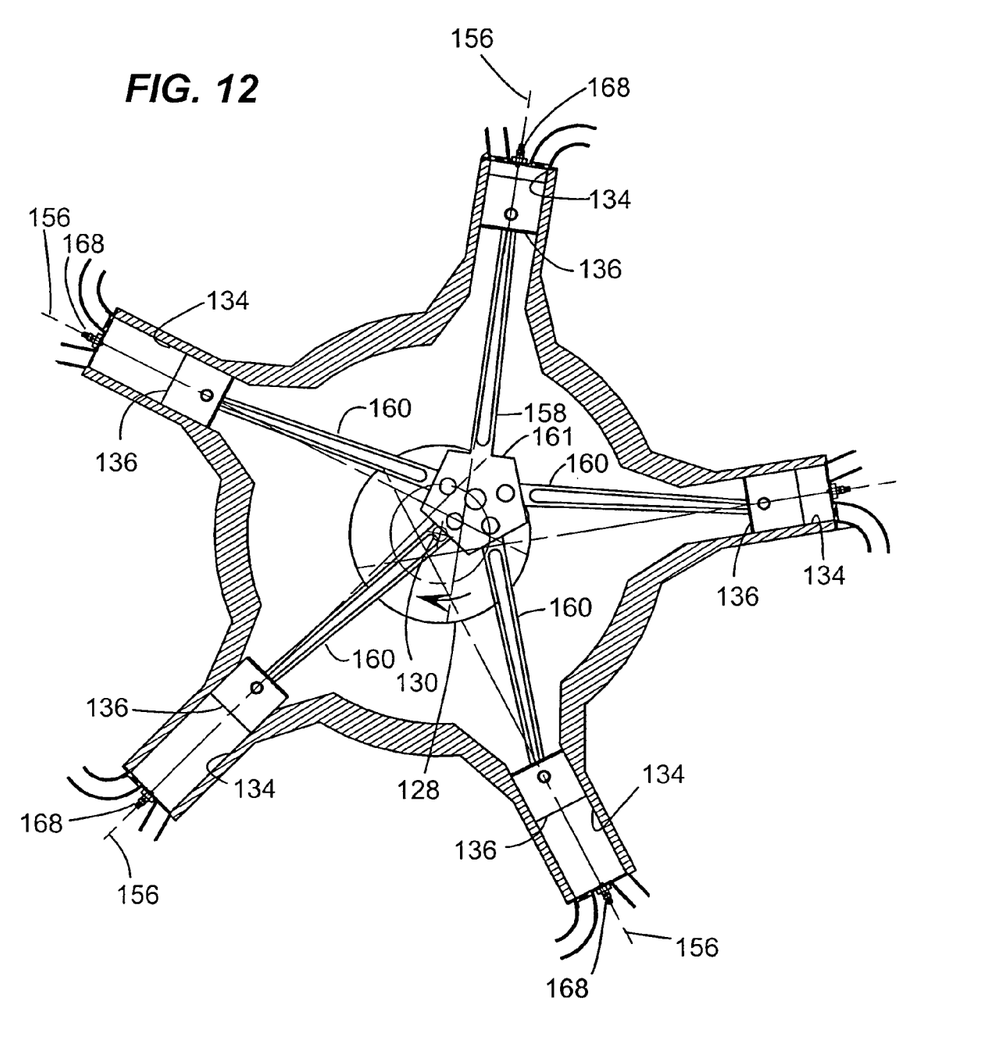
FIG. 12 is a schematic view of a power bank of the split-cycle radial engine of FIG. 10.

Turning now to FIGS. 10 through 12, in an alternative embodiment of the invention, the split-cycle engine 122 may be a radial-type split-cycle engine. The split-cycle radial engine 122 includes a crankshaft 128 rotatable about a crankshaft axis 130. The engine 122 has a power bank 132 including a plurality of power cylinders 134 radially disposed around the crankshaft 128. A power piston 136 is slidably received within each power cylinder 134 and is operatively connected to the crankshaft 128 such that each power piston 136 reciprocates through an expansion stroke and an exhaust stroke during a single rotation of the crankshaft 128. A compression bank 138 is axially adjacent the power bank 132. The compression bank 138 includes a plurality of compression cylinders 140 radially disposed around the crankshaft 128 and equal in quantity to the number of power cylinders 134. A compression piston 142 is slidably received within each compression cylinder 140 and operatively connected to the crankshaft 128 such that each compression piston 142 reciprocates through an intake stroke and a compression stroke during a single rotation of the crankshaft 128. Each compression cylinder 140 is paired with an associated power cylinder 134. Each compression 140 and power cylinder 134 pair includes a gas crossover passage 144 interconnecting the compression cylinder 140 and the power cylinder 134 of the pair. The gas crossover passage 144 includes an inlet valve 146 and an outlet valve 148 defining a pressure chamber 150 therebetween. Valves 152 are also provided to control gas flow into the compression cylinders 140 and out of the power cylinders 134. The valves 144, 146, 152 may be check valves, poppet valves, or any other suitable valve. The valves 144, 146, 152 may be cam actuated, electronically actuated, pneumatically actuated, or hydraulically actuated. An air reservoir 126 may be operatively connected to the pressure chambers 150 by a reservoir passage 154 at locations between the inlet valve 146 and the outlet valve 148 of each pressure chamber 150. The air reservoir 126 is selectively operable to receive and deliver compressed air.

The power bank 132 may be disposed in front of the compression bank 138 to allow for improved air-cooling of the hotter power bank 132 during engine operation. The compression cylinders 140 of the compression bank 138 may be rotated relative to the power cylinders 134 of the power bank 132. In other words, the compression cylinders 140 may not be directly in line with the power cylinders 134 but instead may be rotated a few degrees generally relative to the crankshaft 128 to enhance the flow of air over the compression cylinders 140. Further, a longitudinal axis 156 of each compression cylinder 140 may be offset from the rotational axis 130 of the crankshaft 128. Similarly, a longitudinal axis 156 of each power cylinder 134 also may be offset from the rotational axis 130 of the crankshaft 128. The compression cylinders 140 may have a larger diameter than the power cylinders 134 to allow for a larger volume of intake air. The compression pistons 142 may also have a shorter stroke than the power pistons 136.

One of the power pistons 136 may be operatively connected to the crankshaft 128 by a first fixed master rod 158 and the remainder of the power pistons 136 may be operatively connected to the first master rod 158 by articulating rods 160. The first master rod 158 has a hub 161 at one end (and hence is fixed to the hub 161). The articulating rods 160 are pivotally connected to the hub by knuckle pins or other suitable means. Similarly, one of the compression pistons 142 may be operatively connected to the crankshaft 128 by a second fixed master rod 162 and the remainder of the compression pistons 142 may be operatively connected to the second master rod 162 by articulating rods 164. The second master rod has a hub 166 at one end (and hence is fixed to the hub 166). The articulating rods 164 are pivotally connected to the hub 166 by knuckle pins or other suitable pivotal connection means. It should be understood, however, that the power and compression pistons may be operatively connected to the crankshaft by other mechanical arrangements.

The split-cycle radial engine 122 may include between three and nine power cylinders and an equivalent number of compression cylinders. In the embodiment shown in the drawings, the engine 122 has five power cylinders 134 and five compression cylinders 140. It should be understood, however, that the split-cycle radial engine 122 is not limited to any particular number of power and compression cylinders, so long as there are an equal number of power and compression cylinders and there are at least three power cylinders and three compression cylinders.

If additional power is desired, the split-cycle radial engine 122 may also optionally include a second power bank having a plurality of power cylinders radially disposed around the crankshaft and a second compression bank axially adjacent the second power bank including a plurality of compression cylinders radially disposed around the crankshaft and equal in quantity to the number of power cylinders. The second power bank may be axially adjacent the first compression bank in such a way that the four banks are aligned in a row. A power piston is slidably received within each power cylinder of the second power bank and is operatively connected to the crankshaft such that each power piston reciprocates through an expansion stroke and an exhaust stroke during a single rotation of the crankshaft. Likewise, a compression piston is slidably received within each compression cylinder and operatively connected to the crankshaft such that each compression piston reciprocates through an intake stroke and a compression stroke during a single rotation of the crankshaft. Each compression cylinder of the second compression bank is paired with an associated power cylinder of the second power bank. Each compression and power cylinder pair of the second compression bank and second power bank includes a gas crossover passage interconnecting the compression cylinder and the power cylinder of the pair. The gas crossover passage includes an inlet valve and an outlet valve defining a pressure chamber therebetween. Valves also control gas flow into the compression cylinders of the second compression bank and out of the power cylinders of the second power bank. It should be understood that the split-cycle radial engine 122 may have any number of banks, so long as there is an equal number of power and compression banks.

The compression pistons 142 lag slightly behind the power pistons 136 (in degrees of crank angle rotation). During operation of the engine, as the compression pistons 142 reach top dead center (TDC), the power pistons 136 have already reached TDC and have begun the power stroke. Fuel is ignited in each power cylinder 134 within a range of 5 to 40 degrees crank angle after the power piston 136 associated with the power cylinder 134 has reached its top dead center position (degrees ATDC). Preferably, fuel is ignited in each power cylinder 134 within a range of 10 to 30 degrees ATDC. The power cylinders 134 may be arranged to fire in sequential order as the crankshaft rotates. Further, each power cylinder 134 fires once per revolution of the crankshaft 128. This is in contrast to conventional four-stroke radial engines, wherein as the crankshaft rotates, every other cylinder fires such that for every two rotations of the crankshaft, every cylinder fires one time. The rotational direction of the crankshaft 128 is indicated by an arrow in FIGS. 10-12 that is associated with the crankshaft.

Spark plugs 168 may be provided having electrodes extending into the each of the power cylinders 134 for igniting air-fuel charges at precise times by an ignition control, not shown. It should be understood that the engine 122 may be made as a diesel engine and be operated without a spark plug if desired.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle air hybrid aircraft engine comprising:
a crankshaft rotatable about a crankshaft axis;
a power piston slidably received within a power cylinder and operatively connected to the crankshaft such that the power piston reciprocates through an expansion stroke and an exhaust stroke during a single rotation of the crankshaft;
a compression piston slidably received within a compression cylinder and operatively connected to the crankshaft such that the compression piston reciprocates through an intake stroke and a compression stroke during a single rotation of the crankshaft;
a gas crossover passage operatively interconnecting the compression cylinder and the power cylinder, the gas crossover passage including an inlet valve and an outlet valve defining a pressure chamber therebetween;
an air reservoir operatively connected to the pressure chamber by a reservoir passage at a location between the inlet valve and the outlet valve of the pressure chamber, the air reservoir being selectively operable to receive compressed air from the compression cylinder and to deliver compressed air to the power cylinder for use in transmitting power to the crankshaft during engine operation;
valves selectively controlling gas flow into and out of the compression cylinder, the power cylinder, and the air reservoir;
wherein the engine is mounted to an aircraft and the air reservoir is disposed within the aircraft;
wherein the engine is operable in a high pressure (HP) mode, in the HP mode:
the compression cylinder is selectively controllable to operate as a power cylinder having an expansion stroke and an exhaust stroke; and
both the power cylinder and the compression cylinder receive compressed air from the air reservoir which is expanded on the compression and power cylinder's respective expansion strokes and discharged on their respective exhaust strokes.

2. The split-cycle air hybrid aircraft engine of claim 1, wherein the aircraft has wings, the air reservoir being disposed in the wings.

3. The split-cycle air hybrid aircraft engine of claim 2, wherein the aircraft has a wing spar in each wing, the air reservoir being disposed in at least one of the wing spars.

4. The split-cycle air hybrid aircraft engine of claim 1, wherein the aircraft has a cockpit, a tail, and an aft fuselage proximate the tail, the air reservoir being disposed in the aft fuselage.

5. The split-cycle air hybrid aircraft engine of claim 4, wherein the air reservoir is disposed proximate the tail.

6. The split-cycle air hybrid aircraft engine of claim 1, wherein the compression cylinder is selectively controllable to place the compression piston in a compression mode or an idle mode.

7. The split-cycle air hybrid aircraft engine of claim 1, wherein the power cylinder is selectively controllable to place the power piston in a power mode or an idle mode.

8. The split-cycle air hybrid aircraft engine of claim 7, wherein the engine is operable in at least an internal combustion engine (ICE) mode, an air compressor (AC) mode and a pre-compressed air power (PAP) mode, and wherein:

in the ICE mode, the compression piston and power piston are in their respective compression and power modes, in that the compression piston draws in and compresses inlet air for use in the power cylinder, and compressed air is admitted to the power cylinder with fuel, at the beginning of an expansion stroke, which is ignited, burned and expanded on the same expansion stroke of the power piston, transmitting power to the crankshaft, and the combustion products are discharged on the exhaust stroke;

in the AC mode, the compression piston is in the compression mode and draws in and compresses air which is stored in the air reservoir for later use in the power cylinder; and in the PAP mode, the power cylinder is in the power mode and receives compressed air from the air reservoir which is expanded on the expansion stroke of the power piston, transmitting power to the crankshaft, and the expanded air is discharged on the exhaust stroke.

9. The split-cycle air hybrid aircraft engine of claim 8 wherein, in the PAP mode, fuel is mixed with the compressed air at the beginning of an expansion stroke and the mixture is ignited, burned and expanded on the same expansion stroke of the power piston, transmitting power to the crankshaft, and the combustion products are discharged on the exhaust stroke.

10. The split-cycle air hybrid aircraft engine of claim 8 wherein, in the PAP mode, the compressed air admitted to the power cylinder is expanded without adding fuel or initiating combustion.

11. The split-cycle air-hybrid aircraft engine of claim 1 wherein:

in the power cylinder, fuel is mixed with the compressed air at the beginning of an expansion stroke and the mixture is ignited, burned and expanded on the same expansion stroke of the power cylinder; and in the compression cylinder, compressed air admitted to the compression cylinder is expanded on the expansion stroke of the compression cylinder without adding fuel or initiating combustion.

12. The split-cycle air hybrid aircraft engine of claim 1, wherein fuel is ignited within a range of 5 to 40 degrees crank angle (CA) after the power piston has reached its top dead center (TDC) position.

13. The split-cycle air hybrid aircraft engine of claim 12, wherein fuel is ignited within a range of 10 to 30 degrees crank angle (CA) after the power piston has reached its top dead center (TDC) position.

* * * * *